Patented Nov. 16, 1948

2,454,061

UNITED STATES PATENT OFFICE 2,454,061

2-ETHYL-HEXYL, N-OCTADECYL TETRACHLOROPHTHALAMIDATE AND INSECTICIDAL COMPOSITIONS CONTAINING THE SAME

Mark L. Hill, Bethel Township, Delaware County, and Herschel G. Smith, Wallingford, Pa., assignors to Gulf Oil Corporation, Pittsburgh, Pa., a corporation of Pennsylvania No Drawing. Application February 3, 1948, Serial No. 6,018

6 Claims. (Cl. 167—30)

This invention relates to 2-ethyl-hexyl, N-octadecyl tetrachlorophthalamidate, a new chemical compound, and to insecticidal compositions containing it.

The use of insecticide toxicants is variously practiced in the art. Many are incorporated in mineral base oils for the purpose of providing sprays and livestock dips. Toxicants are also frequently used with inert powders which may be dusted onto areas inhabited by insects, while further forms of application are found in coating compositions containing plastics or waxes and one or more insecticidal ingredients. Many toxicants are also used in the form of aqueous solutions, dispersions and emulsions which may be sprayed on insects and their habitat.

Accordingly, an object accomplished by this invention is the provision of a novel insecticidal toxicant.

A further object accomplished by this invention is the provision of a novel insecticidal toxicant which may be incorporated with various other insecticidal ingredients known to the art.

A still further object accomplished by this invention is the provision of a new chemical compound which exhibits as one of its useful properties a toxicity advantageously adapting it for insecticidal applications.

Other objects appear hereinafter.

The toxicant of the present invention is 2-ethyl-hexyl, N-octadecyl tetrachlorophthalamidate having the following structural formula:

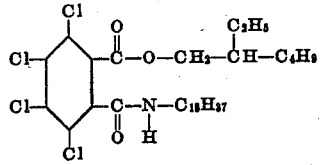

The above compound was prepared by reacting 304 grams of tetrachlorophthalic acid with 135 grams of monooctadecylamine and 130 grams of 2-ethyl-hexanol in 560 grams of a petroleum solvent within the kerosene boiling range. The mixture was refluxed and the water of formation removed to complete the reaction, the period of time required being about four hours. The final solution was found to contain 50 per cent by weight of the reaction product and may be used without further treatment as an insecticidal toxicant ingredient. However, the product of the reaction, which is a white crystalline material having a melting point of 206° F., may first be separated out and then used to compound insecticides. Relatively small amounts of this product dissolved in major proportions of a petroleum solvent are useful as insecticide compositions.

The use of 2-ethyl-hexyl, N-octadecyl tetrachlorophthalamidate as an insecticidal toxicant is illustrated by the specific examples in the table. The fly killing test, Gulf Method 223, is set forth in detail in U. S. Patent 2,421,223.

Table

| | I | II |
|---|---|---|
| Insecticide | | |
| Make-up: Per cent by Weight | | |
| 2-ethyl-hexyl, N-octadecyl tetrachlorophthalamidate | 1.0 | 0.5 |
| Solution of 100 mg. pyrethrins per 100 cc. in a hydrocarbon solvent | | 50.0 |
| Petroleum Solvent | 99.0 | 49.5 |
| Inspection: | | |
| Fly Killing Test | | |
| Method 223, Gulf | | |
| No. of Tests | 10 | 10 |
| No. of Flies | 1,007 | 1,036 |
| Temperature: ° F | 81 | 82 |
| Relative Humidity: Per cent | 63 | 59 |
| Average Tests: | | |
| Down, 10 Min.: Per cent | 98 | 97 |
| Time of Knockdown: Sec | 39.4 | 56.2 |
| Killed, 24 Hr.: Per cent | 79 | 71 |
| Difference between the kill of the sample and that of the Official Test Insecticide (NAIDM) [1] | +31 | +22 |

[1] National Association of Insecticide and Disinfectant Manufacturers, Inc., New York, N. Y.

While the toxicant of the present invention may advantageously be used with a petroleum base solvent, such as naphtha, kerosene, and heavier cuts for livestock dips, this invention is not to be limited thereto. For example, 2-ethyl-hexyl, N-octadecyl tetrachlorophthalamidate may be compounded with or without other toxicants and fungicides and with the diluents and carriers commonly used in the art. These materials classified herein as carriers and referred to in the appended claims by the term "carrier" include aliphatic and aromatic hydrocarbon solvents, active and inert solid diluents, sticking and spreading agents, coating materials containing waxes and plastic compositions, aqueous dispersions and emulsions, or more broadly, any material which aids in carrying the toxicant to or within the proximity of insects.

Solid diluents with which the toxicant of the present invention may be used to prepare a dusting powder include wood flour, talc, gypsum, bentonite, kieselguhr, diatomaceous earth, and the like.

If an aqueous carrier is used, a wide variety of the well known wetting, dispersing and emulsifying agents may be embodied in the insecticide composition. These agents may include the alkali metal salts of sulfonated oils, sodium lauryl sulfate, salts of sulfonated aromatics, esters of fatty acids, soaps, alkanolamines, and the like.

While only relatively small amounts of 2-ethyl-hexyl, N-octadecyl tetrachlorophthalamidate, such as from 0.1 to 2.0 per cent by weight, are necessary to impart substantial toxicity to insecticidal compositions containing the same, larger proportions up to 10.0 per cent by weight may be used where desirable.

What we claim is:

1. The compound, 2-ethyl-hexyl, N-octadecyl tetrachlorophthalamidate.

2. An insecticidal composition comprising a toxic amount of 2-ethyl-hexyl, N-octadecyl tetrachlorophthalamidate.

3. An insecticidal composition comprising a toxic amount of 2-ethyl-hexyl, N-octadecyl tetrachlorophthalamidate, and a carrier therefor.

4. An insecticidal composition comprising a toxic amount of 2-ethyl-hexyl, N-octadecyl tetrachlorophthalamidate, and a solvent therefor.

5. An insecticidal composition comprising from 0.1 to 10.0 per cent by weight of 2-ethyl-hexyl, N-octadecyl tetrachlorophthalamidate and a carrier therefor.

6. An insecticidal composition comprising from about 0.1 to 10.0 per cent by weight of 2-ethyl-hexyl, N-octadecyl tetrachlorophthalamidate and a hydrocarbon solvent therefor.

MARK L. HILL.
HERSCHEL G. SMITH.

No references cited.